(12) United States Patent
Reinking et al.

(10) Patent No.: US 6,884,834 B2
(45) Date of Patent: Apr. 26, 2005

(54) SHEAR MODIFICATION OF HDPE-CLAY NANOCOMPOSITES

(75) Inventors: Mark K. Reinking, Mason, OH (US); Karl P. Rufener, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 288 days.

(21) Appl. No.: 10/247,593

(22) Filed: Sep. 19, 2002

(65) Prior Publication Data

US 2004/0059024 A1 Mar. 25, 2004

(51) Int. Cl.$^7$ ................................................ C08J 3/34
(52) U.S. Cl. ....................... 524/445; 524/186; 524/447; 501/145; 501/147
(58) Field of Search ................................ 524/445, 447, 524/186, 582, 570, 236

(56) References Cited

U.S. PATENT DOCUMENTS

| | | | |
|---|---|---|---|
| 3,956,230 A | 5/1976 | Gaylord | 260/42.14 |
| 4,187,210 A | 2/1980 | Howard, Jr. | 260/42.14 |
| 4,661,537 A | 4/1987 | Ancker et al. | 523/200 |
| 5,717,000 A * | 2/1998 | Karande et al. | 521/83 |
| 5,910,523 A | 6/1999 | Hudson | 523/213 |
| 5,973,053 A | 10/1999 | Usuki et al. | 524/445 |
| 6,051,643 A | 4/2000 | Hasegawa et al. | 524/445 |
| 6,103,817 A | 8/2000 | Usuki et al. | 524/574 |
| 6,117,932 A | 9/2000 | Hasegawa et al. | 524/445 |
| 6,136,908 A | 10/2000 | Liao et al. | 524/445 |
| 6,171,993 B1 | 1/2001 | Mavridis et al. | 502/103 |
| 6,287,634 B1 | 9/2001 | Beall et al. | 427/220 |
| 6,407,155 B1 | 6/2002 | Qian et al. | 524/445 |
| 6,656,995 B1 * | 12/2003 | Klendworth et al. | 524/445 |
| 2002/0161096 A1 * | 10/2002 | Loontjens et al. | 524/445 |

FOREIGN PATENT DOCUMENTS

WO    WO 01/30864    3/2001

OTHER PUBLICATIONS

Hasegawa et al., "Preparation and Mechanical Properties of Polypropylene–Clay Hybrids Using a Maleic Anhydride–Modified Polypropylene Oligomer," *Journal of Applied Polymer Science*, vol. 67, 87–92 (1998), John Wiley & Sons, Inc., 1998.

Jeon et al., "Morphology of polymer/silicate nanocomposites," *Polymer Bulletin*, 41, 107–113 (1998), Springer–Verlag 1998.

Reichert et al., Poly(propylene)/organoclay nanocomposite formation: Influence of compatibilizer functionality and organoclay modification, *Macromolecular Material and Engineering* 275, 8–17 (2000).

Lim et al., "Phase morphology and rheological behavior of polymer/layered silicate nanocomposites," *Rheol Acta* (2001), 40: 220–229, Springer–Verlag 2001.

Kodgire et al., "PP/Clay Nanocomposites: Effect of Clay Treatment on Morphology and Dynamic Mechanical Properties," *Journal of Applied Polymer Science*, vol. 81, 1786–1792 (2001), John Wiley & Sons, Inc., 2001.

Wang et al., "Synthesis and characterization of maleated polyethylene/clay nanocomposites," *Polymer* 42 (2001) 9819–9826, Elsevier.

Wang et al., "Effect of aspect ratio of clay on melt extensional process of maleated polyethylene/clay nanocomposites," *Polymer Bulletin*, 46, 499–505 (2001), Springer–Verlag 2001.

* cited by examiner

*Primary Examiner*—Katarzyna Wyrozebski
(74) *Attorney, Agent, or Firm*—Shao-Hua Guo

(57) ABSTRACT

A method for modifying a high-density polyethylene (HDPE)-clay nanocomposite is disclosed. The method comprises shearing a melt of the nanocomposite at an effective shear rate. The modified nanocomposite shows significantly increased complex melt viscosity, storage modulus, and loss modulus.

13 Claims, No Drawings

SHEAR MODIFICATION OF HDPE-CLAY NANOCOMPOSITES

FIELD OF THE INVENTION

The invention relates to a nanocomposite. More particularly, the invention relates to shear modification of a high-density polyethylene-clay nanocomposite.

BACKGROUND OF THE INVENTION

Polymer-clay nanocomposites are known. They are materials comprising a polymer matrix and exfoliated clay that is dispersed in the polymer matrix. Nanocomposites have improved mechanical properties and heat resistance compared with the base polymer. Moreover, due to the layered structures, nanocomposites have increased barrier to oxygen. This characteristic makes nanocomposites desirable candidates for the packaging materials. Thus, there is an increasing interest in developing polyolefin-clay nanocomposites since polyolefins are the most widely used packaging materials.

Clays are hydrophilic. Thus, to prepare polymer-clay composites, clays are treated with organic compounds to convert then into organoclays. Organoclays have improved compatibility with polymers, in particular, with polar polymers such as polyamide. When an organoclay is dispersed in a polymer matrix, the polymer chains insert between the adjacent layers and thereby the clay is delaminated. This process is called exfoliation.

Polyolefin-clay nanocomposites are difficult to make because organoclay and polyolefin are incompatible. To prepare polyolefin-clay nanocomposites, polymeric compatiblizing agents are required. See, e.g., www.Nanoclay.com. See also Peter Reichert et al., *Macromol. Mater. Eng.*, 275, pp. 8–17 (2000). Maleated polyolefins are commonly used compatiblizing agents. They are expensive. Further, the addition of maleated polymers often alters the desired properties of the nanocomposites.

Shear modification of polyolefins is also known. For instance, U.S. Pat. No. 6,171,993 teaches low-shear modification of LLDPE. The modified LLDPE shows decreased melt elasticity. However, shear modification of nanocomposite is unknown. Such modification is of significant commercial value because the modification procedure is convenient and inexpensive. Ideally, the modified nanocomposites would have significantly enhanced rheological, mechanical, and barrier properties.

SUMMARY OF THE INVENTION

The invention is a method for modifying a high-density polyethylene (HDPE)-clay nanocomposite. The method comprises shearing a melt of the nanocomposite at an effective shear rate to improve rheological properties. We have surprisingly found that the modified nanocomposite has significantly increased complex melt viscosity, storage modulus, and loss modulus.

DETAILED DESCRIPTION OF THE INVENTION

The invention is a method for modifying high-density polyethylene (HDPE)-clay nanocomposites. The method comprises shearing a melt of the nanocomposite at an effective shear rate.

Methods of forming the melt may vary widely. The manner in which the melt is formed is not critical and any conventional method may be employed. Normally, the melt is formed by heating the nanocomposite to a temperature above the melting point of the nanocomposite. The upper limit of the temperature is not critical provided that the temperature is not so high as to thermally degrade the nanocomposite.

By "an effective shear rate" we mean that the melt is subjected to a shear that is effective to provide an improvement in, e.g., rheological, mechanical, or barrier property of the nanocomposite. Preferably, the shear rate is 0.01 $\sec^{-1}$ or greater. The upper limit for the shear rate is not critical provided that the shear rate is not so high as to physically degrade the nanocomposite. More preferably, the shear rate is within the range of about 0.01 $\sec^{-1}$ to about 100 $\sec^{-1}$. Most preferably, the shear rate is within the range of about 0.01 $\sec^{-1}$ to about 10 $\sec^{-1}$.

Any method to shear a polymer melt can be used. The method of choice is largely dictated by convenience. Examples of shearing methods include thermal shock, pressure alteration, ultrasonics, and mechanical shearing. In one useful procedure, the polymer melt is sheared by thermal shock in which shearing is achieved by alternately raising or lowering the temperature of the melt causing thermal expansions and resulting in internal stresses which cause the shear.

In yet another useful procedure, the melt can be subjected to shear by electrical methods in which shear is achieved by high frequency electomagnetic waves impinging on the melt, and by electrical shock using waver amplitude and frequencies to cause shear.

Preferably, mechanical shearing methods are employed. On a lab scale, a mechanical shearing can be produced using a rheometer. On a commercial scale, shearing is preferably produced by extrusion in which shearing is achieved by introducing the polymer melt at one end of the extruder (single or double screw) and receiving the sheared polymer at the other end of the extruder.

Suitable HDPE-clay nanocomposites for use in the invention include those made by solution, in-situ polymerization, and melt formation. In the solution method, an organoclay and HDPE are dissolved in an organic solvent. After evaporation of solvent, a nanocomposite results. In in-situ polymerization, an organoclay is placed in a monomer solution, the monomer polymerizes, and a nanocomposite forms. In melt formation, a molten HDPE is blended with an organoclay. All of these methods are known in the art.

Preferably, the nanocomposite is prepared by a solution method disclosed in co-pending application Ser. No. 10/096, 640. The method comprises dispersing or dissolving an organoclay in an aromatic solvent and then adding an HDPE into the resulting clay dispersion or solution. A polar solvent can be added to facilitate the intercalation. Suitable polar solvents include alcohols, glycols, ethers, esters, carbonates, and ketones. Many other polar compounds capable of swelling and increasing interlayer spacing of clay can be used. See, e.g., U.S. Pat. No. 6,287,634. One advantage of the solution method is that no compatiblizing agent is needed.

The key to the successful preparation of a nanocomposite is to exfoliate the clay so that the clay can be dispersed in the polymer matrix to form layered structures. The layered structures can be measured by, for example, transmission electron microscopy (TEM).

Suitable HDPE has a density of 0.94 $g/cm^3$ or greater. See ASTM D4976-98: Standard Specification for Polyethylene Plastic Molding and Extrusion Materials. HDPE can be an ethylene homopolymer or a copolymer of ethylene with a minor portion of a $C_3$ or longer α-olefin. HDPE includes those made by Ziegler catalysts and by newly developed single-site catalysts.

Suitable clays include montmorillonite, saponite, hectorite, mica, vermiculite, bentonite, nontronite, beidellite, volkonskoite, magadite, and kenyaite, the like, and mixtures thereof. Preferably, the clays are modified, for example, with quaternary ammonium compounds. The modified clays are called organoclays. Organoclays are commercially available, for example, from Southern Clay Products, Inc.

Preferably, the nanocomposite has an HDPE/clay weight ratio from about 1:1 to about 100:1. More preferably, the ratio is from about 5:1 to about 50:1. HDPE forms a matrix wherein the exfoliated clay is dispersed. In addition to HDPE and clay, the nanocomposite comprises optional components, including fillers, plasticizers, mold release agents, antioxidants, ultraviolet light stablizers, antistatic agents, flame retardants, and the like, and mixtures thereof. These optional components are well known in the polymer industry.

One improvement of the shear-modified nanocomposite is the enhanced rheological properties, including complex viscosity ($\eta^*$), storage modulus (G'), and loss modulus (G"). Methods for measuring Theological properties are known. See, for instance, ASTM D 4440-84. The Theological properties directly relate to the processability of the nanocomposite. We have found that the shear-modified HDPE-clay nanocomposites have considerably increased $\eta^*$, G', and G".

The following examples merely illustrate the invention. Those skilled in the art will recognize many variations that are within the spirit of the invention and scope of the claims.

EXAMPLE 1

Shear Modification of HDPE-Clay Nanocomposite

Preparation of HDPE-Clay Nanocomposite

Clay (6.4 g, Claytone HY, product of Southern Clay Products, Inc.) is added to and mixed with xylene (1,500 mL) using a high shear mixer. The mixture is stirred for five minutes. Acetone (3.2 g) is then added to the solution. The resulting mixture is stirred for additional five minutes. The mixing stops for one-half hour, then continues for an additional five minutes. The solution is then poured into a three-neck flask equipped with an overhead paddle type stirrer, a nitrogen inlet, and a nitrogen outlet which is connected to a bubbler. A high-density polyethylene (HDPE) (100 g, H4837, product of Equistar Chemicals, LP) is added to the solution. The mixture is stirred for three hours. The mixing stops and the mixture stands overnight. The next day, the polymer is dissoved by heating the mixture to 110° C. for four hours and then the resulting mixture is poured onto a pan. After the solvent evaporates, the resulting HDPE-clay nanocomposite is collected, cut into strips, and dried under vacuum at 80° C.

Tem Test

The nanocomposite sample is pressed into a 1–2 mm thick plate in a hot press. Part of the plate is cryogenically cross-sectioned using a Reichert-Jung FC4E cryo-ultra microtome into 40–50 nm thin cross-sections under nitrogen at −50° C. The cross-sections are then mounted on a copper grid for TEM. TEM observation is done with a JEOL EM-ASI D10 TEM using an acceleration voltage of 120 KV. TEM shows that the clay is exfoliated into tactoids with about 10 clay sheets per tactoid.

Shear Modification

Shear-modification is performed in an ARES rheometer. The nanocomposite sample is melt at 150° C. The melt is subject to shearing at a shear rate of 0.02 sec$^{-1}$ for 50–70 minutes.

Rheological Test

Rheological properties are determined for the nanocomposite samples before and after shear modification using a standard test procedure, ASTM D 4440-84. The frequencies range from 0.01 to 100 rad/sec. The rheometer is operated at 190° C. in a nitrogen environment to minimize oxidation or degradation of the sample. The gap in the parallel plate geometry is 1.2–1.4 mm and the strain amplitude is 10%. The results are listed in Table 1, which indicates that the shear modification significantly increases the complex viscosity ($\eta^*$), storage modulus (G'), and loss modulus (G").

TABLE 1

| | Before Shear Modification | | | After Shear Modification | | |
|---|---|---|---|---|---|---|
| Shear rate sec$^{-1}$ | G' dyn/cm$^2$ | G" dyn/cm$^2$ | $\eta^*$ Poise | G' dyn/cm$^2$ | G" dyn/cm$^2$ | $\eta^*$ Poise |
| 0.1 | 2.0 × 10$^3$ | 3.4 × 10$^3$ | 3.9 × 10$^4$ | 5.5 × 10$^3$ | 5.3 × 10$^3$ | 7.6 × 10$^4$ |
| 1 | 7.1 × 10$^3$ | 1.4 × 10$^4$ | 1.6 × 10$^4$ | 1.3 × 10$^4$ | 2.0 × 10$^4$ | 2.4 × 10$^4$ |
| 10 | 3.7 × 10$^4$ | 7.0 × 10$^4$ | 8.0 × 10$^3$ | 5.2 × 10$^4$ | 8.8 × 10$^4$ | 9.8 × 10$^3$ |
| 100 | 2.0 × 10$^5$ | 3.0 × 10$^5$ | 3.6 × 10$^3$ | 2.3 × 10$^5$ | 3.2 × 10$^5$ | 3.9 × 10$^3$ |

EXAMPLE 2

Shear Modification of HDPE-Clay Nanocomposite

The procedure of Example 1 is repeated but 19.2 g of Claytone HY, 2000 mL of xylene, 9.6 g of acetone, and 300 g of HDPE (M5370, product of Equistar Chemicals, LP) are used. TEM shows that the clay is exfoliated into tactoids with a broad size distribution ranging from 1 to 100 sheets per tactoid. The nanocomposite samples are tested for rheological properties before and after shear modification. The results are listed in Table 2, which indicates that the shear modification significantly increases $\eta^*$, G', and G".

TABLE 2

| | Before Shear Modification | | | After Shear Modification | | |
|---|---|---|---|---|---|---|
| Shear rate sec$^{-1}$ | G' dyn/cm$^2$ | G" dyn/cm$^2$ | $\eta^*$ Poise | G' dyn/cm$^2$ | G" dyn/cm$^2$ | $\eta^*$ Poise |
| 0.1 | 2.0 × 10$^3$ | 5.0 × 10$^3$ | 5.4 × 10$^4$ | 3.5 × 10$^3$ | 8.1 × 10$^3$ | 8.8 × 10$^4$ |
| 1 | 8.9 × 10$^3$ | 2.9 × 10$^4$ | 3.0 × 10$^4$ | 1.6 × 10$^4$ | 4.4 × 10$^4$ | 4.7 × 10$^4$ |
| 10 | 7.1 × 10$^4$ | 1.7 × 10$^5$ | 1.8 × 10$^4$ | 1.1 × 10$^5$ | 2.4 × 10$^5$ | 2.7 × 10$^4$ |
| 100 | 5.0 × 10$^5$ | 7.2 × 10$^5$ | 8.8 × 10$^3$ | 7.1 × 10$^5$ | 9.6 × 10$^5$ | 1.2 × 10$^4$ |

EXAMPLE 3

Shear Modification of HDPE-Clay Nanocomposite

Example 2 is repeated but HDPE H4837 (product of Equistar Chemicals, LP) is used. TEM shows that the clay is exfoliated into tactoids with about 50 sheets per tactoid. The nanocomposite samples are tested for rheological properties before and after shear modification. The results are listed in Table 3, which indicates that the shear modification significantly increases $\eta^*$, G', and G".

TABLE 3

| | Before Shear Modification | | | After Shear Modification | | |
|---|---|---|---|---|---|---|
| Shear rate sec$^{-1}$ | G' dyn/cm$^2$ | G" dyn/cm$^2$ | $\eta^*$ Poise | G' dyn/cm$^2$ | G" dyn/cm$^2$ | $\eta^*$ Poise |
| 0.1 | 8.8 × 10$^3$ | 6.9 × 10$^3$ | 1.1 × 10$^5$ | 1.4 × 10$^4$ | 9.3 × 10$^3$ | 1.7 × 10$^5$ |
| 1 | 1.9 × 10$^4$ | 2.5 × 10$^4$ | 3.1 × 10$^4$ | 2.8 × 10$^4$ | 3.2 × 10$^4$ | 4.3 × 10$^4$ |
| 10 | 6.7 × 10$^4$ | 1.0 × 10$^5$ | 1.2 × 10$^4$ | 9.1 × 10$^4$ | 1.2 × 10$^5$ | 1.5 × 10$^4$ |
| 100 | 2.9 × 10$^5$ | 3.9 × 10$^5$ | 4.8 × 10$^3$ | 3.5 × 10$^5$ | 4.4 × 10$^5$ | 5.6 × 10$^3$ |

COMPARATIVE EXAMPLE 4

Shear Modification of LLDPE-Clay Nanocomposite

Claytone HY (6.4 g) is dispersed in toluene (1,500 mL) using an overhead paddle type stirrer. To the clay dispersion is added 100 g of linear-low-density polyethylene (LLDPE) (GATR311, product of Equistar Chemicals, LP). The mixture is heated to 98° C. and then poured onto a pan to dry. TEM shows that the clay is exfoliated into tactoids with about 75 clay sheets per tactoid. The nanocomposite samples are tested for rheological properties before and after shear modification. The results are listed in Table 4, which indicates that the shear modification does not significantly increase the rheological properties at a relatively low shear rate (0.1 sec$^{-1}$).

TABLE 4

| | Before Shear Modification | | | After Shear Modification | | |
|---|---|---|---|---|---|---|
| Shear rate sec$^{-1}$ | G' dyn/cm$^2$ | G" dyn/cm$^2$ | $\eta^*$ Poise | G' dyn/cm$^2$ | G" dyn/cm$^2$ | $\eta^*$ Poise |
| 0.1 | 2.6 × 10$^4$ | 5.0 × 10$^4$ | 5.6 × 10$^5$ | 2.1 × 10$^4$ | 5.3 × 10$^4$ | 5.7 × 10$^5$ |
| 1 | 1.2 × 10$^5$ | 2.36 × 10$^5$ | 2.6 × 10$^5$ | 1.3 × 10$^5$ | 2.7 × 10$^5$ | 3.0 × 10$^5$ |
| 10 | 7.0 × 10$^5$ | 8.3 × 10$^5$ | 1.1 × 10$^5$ | 8.4 × 10$^5$ | 1.0 × 10$^6$ | 1.3 × 10$^5$ |
| 100 | 2.6 × 10$^6$ | 1.9 × 10$^6$ | 3.2 × 10$^4$ | 3.2 × 10$^6$ | 2.4 × 10$^6$ | 4.0 × 10$^4$ |

COMPARATIVE EXAMPLE 5

Shear Modification of LLDPE-Clay Nanocomposite

The general procedure of Example 1 is followed, but clay Lucentite STN (product of Co-Op Chemical Co., LTD) is used. TEM shows that the clay is exfoliated into tactoids with about 50 clay sheets per tactoid. The nanocomposite samples are tested for rheological properties before and after shear modification. The results are listed in Table 5, which indicates that the shear modification does not increase the rheological properties.

TABLE 5

| | Before Shear Modification | | | After Shear Modification | | |
|---|---|---|---|---|---|---|
| Shear rate sec$^{-1}$ | G' dyn/cm$^2$ | G" dyn/cm$^2$ | $\eta^*$ Poise | G' dyn/cm$^2$ | G" dyn/cm$^2$ | $\eta^*$ Poise |
| 0.1 | 4.7 × 10$^3$ | 2.4 × 10$^4$ | 2.5 × 10$^5$ | 5.3 × 10$^3$ | 2.5 × 10$^4$ | 2.5 × 10$^5$ |
| 1 | 5.2 × 10$^4$ | 1.5 × 10$^5$ | 1.5 × 10$^5$ | 5.3 × 10$^4$ | 1.4 × 10$^5$ | 1.5 × 10$^5$ |
| 10 | 4.4 × 10$^5$ | 6.2 × 10$^5$ | 7.5 × 10$^4$ | 4.1 × 10$^5$ | 5.7 × 10$^5$ | 7.0 × 10$^4$ |
| 100 | 1.9 × 10$^6$ | 1.5 × 10$^6$ | 2.4 × 10$^4$ | 1.7 × 10$^6$ | 1.3 × 10$^6$ | 2.2 × 10$^4$ |

We claim:

1. A method comprising shearing a belt of a high-density polyethylene (HDPE)-clay nanocomposite at a shear rate effective to provide an improvement in rheological, mechanical, or barrier property of the nanocomposite, wherein the nanocomposite is prepared by a solution process comprising mixing an organoclay and an HDPE in an organic solvent and then evaporating the solvent, said solvent being a mixture of an aromatic solvent and a polar solvent selected from the group consisting of ethers, esters, glycols, alcohols, carbonates, and ketones.

2. The method of claim 1 wherein the shear rate is about 0.01 sec$^{-1}$ or greater.

3. The method of claim 1 wherein the shear rate is within the range of about 0.01 sec$^{-1}$ to about 100 sec$^{-1}$.

4. The method of claim 1 wherein the shear rate is within the range of about 0.01 sec$^{-1}$ to about 10 sec$^{-1}$.

5. The method of claim 1 wherein the shear rate is within the range of about 0.1 sec$^{-1}$ to about 10 sec$^{-1}$.

6. The method of claim 1 wherein the shear rate is within the range of about 0.1 sec$^{-1}$ to about 1 sec$^{-1}$.

7. The method of claim 1 wherein the nanocomposite has an HDPE/clay weight ratio within the range of about 100:1 to about 1:1.

8. The method of claim 1 wherein the nanocomposite has an HDPE/clay weight ratio within the range of about 50:1 to about 5:1.

9. The method of claim 1 wherein the mixing is performed in the absence of polymeric compatiblizing agent.

10. The method of claim 1 wherein the organoclay is an alkyl amine- or quaternary ammonium-modified clay.

11. The method of claim 1 wherein the polar solvent is a ketone.

12. The method of claim 1 wherein the polar solvent is acetone.

13. The method of claim 1 wherein the solvent mixture has a weight ratio of aromatic solvent/polar solvent greater than 50:50.

* * * * *